United States Patent
Saile

[11] Patent Number: 5,496,988
[45] Date of Patent: Mar. 5, 1996

[54] DEVICE FOR SOLDERING COMPONENTS ON PLATES

[75] Inventor: Peter Saile, Stuttgart, Germany

[73] Assignee: Robert Bosch GmbH, Stuttgart, Germany

[21] Appl. No.: 362,415

[22] PCT Filed: Jun. 8, 1993

[86] PCT No.: PCT/DE93/00491

§ 371 Date: Dec. 27, 1994

§ 102(e) Date: Dec. 27, 1994

[87] PCT Pub. No.: WO94/00267

PCT Pub. Date: Jan. 6, 1994

[30] Foreign Application Priority Data

Jun. 25, 1992 [DE] Germany ............ 42 20 802.5

[51] Int. Cl.⁶ ................ F27B 9/04; F27B 9/32; F27D 1/18
[52] U.S. Cl. ............ 219/388; 219/385; 373/73; 373/77; 432/206
[58] Field of Search ................ 219/385, 388, 219/389, 391, 392, 420; 373/73, 75, 77; 432/206, 254.2, 247, 248, 249, 250, 251

[56] References Cited

U.S. PATENT DOCUMENTS

| | | | |
|---|---|---|---|
| 2,081,990 | 6/1937 | Eberwein | 432/206 |
| 2,283,982 | 5/1942 | Germany | 432/206 |
| 2,558,088 | 6/1951 | Hoop | 432/206 |
| 3,975,145 | 8/1976 | Hill et al. | 432/10 |
| 4,833,301 | 5/1989 | Furtek | 219/388 |
| 5,296,680 | 3/1994 | Yamada | 219/388 |
| 5,317,127 | 5/1994 | Brewster et al. | 219/388 |

FOREIGN PATENT DOCUMENTS

| | | |
|---|---|---|
| 2318702 | 2/1977 | France . |
| 262468 | 5/1927 | United Kingdom . |
| 454574 | 10/1936 | United Kingdom . |

Primary Examiner—Teresa J. Walberg
Assistant Examiner—J. Pelham
Attorney, Agent, or Firm—Spencer & Frank

[57] ABSTRACT

The invention relates to a device for soldering components on plates under the influence of a gas, having an at least two-piece housing, wherein a seal is provided between the housing elements. It is proposed to employ a liquid as the sealing means. It is achieved by means of this that the mechanical stresses occurring because of thermal stress can be absorbed immediately, because of which the formation of a leak is prevented in a simple manner.

5 Claims, 1 Drawing Sheet

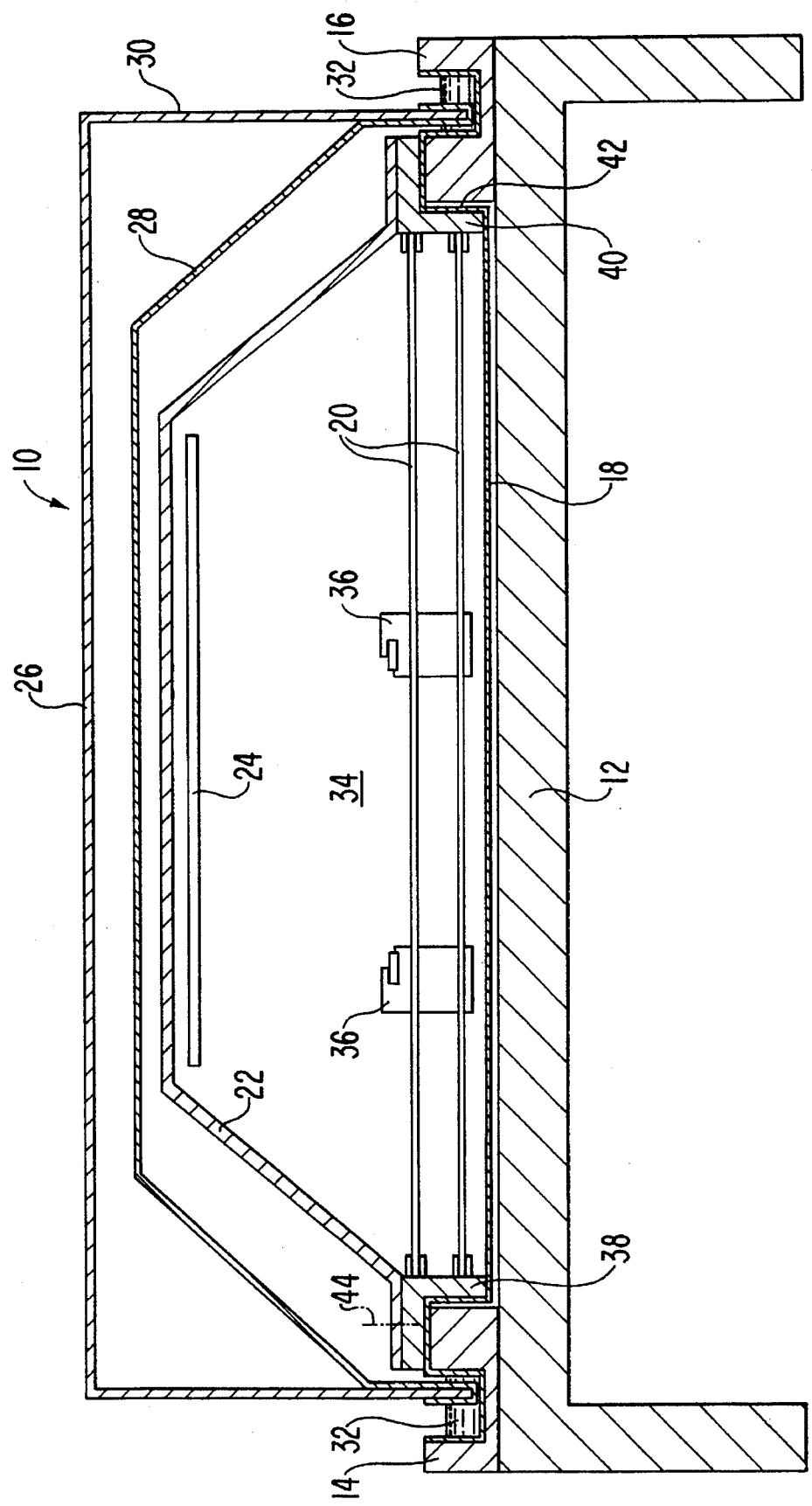

DEVICE FOR SOLDERING COMPONENTS ON PLATES

STATE OF THE ART

The invention relates to a device for soldering components on plates under the effect of a gas, and having an at least two-piece housing, and with a seal being provided between the housing elements. As a rule such devices, hereinafter called continuous furnace, have a conduit on whose exterior or interior sides heating devices are disposed. To execute the soldering process in a defined atmosphere, a protective gas is preferably blown into the center area of the conduit, which, when flowing out in the direction of the conduit openings, displaces the oxygen flowing or diffusing in.

The furnace of this type conduit of protective gas continuous furnaces must be accessible for maintenance and cleaning work. Thus the furnace conduit, which inevitably must be divisible, must be absolutely gas-tight during operation, except for the inlet and outlet openings. Because of the large drop in partial oxygen pressure, even the smallest microscopic fissures in the furnace wall result in considerable enrichment of the protective gas atmosphere with oxygen and thus in a decrease in the quality of the product. The points of separation of the divisible conduit are particularly susceptible to such micro-leaks. Known continuous furnaces have flanges which are screwed or clamped together with inserted seals of copper or heat-resistant plastic. These connecting points are subject to great mechanical loads because of the stresses during changes in temperature when the furnaces are switched on and off, as well as the operationally caused temperature gradients in the linear (longitudinal) direction of the furnace.

SUMMARY AND ADVANTAGES OF THE INVENTION

The disadvantages of the prior art devices are overcome according to the present invention by a device for soldering components on plates under the effect of a gas which has an at least two-piece housing with a seal being provided between the housing elements, and wherein a liquid is utilized as the sealing means.

In contrast to the known devices, the device in accordance with the invention basically described above has the advantage that temperature-caused linear changes of individual parts of the continuous furnace do not result in any stresses within the sealing means and that leaky places cannot occur. Furthermore, the furnace chamber is easily accessible at any time, because of which it is not necessary to install a fresh, expensive, specially adapted seal after one or a defined number of openings. The liquid sealant is furthermore considerably cheaper and simpler and can be replaced more quickly than conventional solid seals.

Mutual sealing of the two housing elements by means of a liquid makes possible the assured gas tightness while making the least demands on precise manufacture.

Advantageous embodiments of the device in accordance with the main claim are possible by means of the steps recited in the dependent claims. A simple and uncomplicated structure results if a first housing element has at least one liquid reservoir into which a second, preferably cover-shaped housing element partially dips. The cover-shaped housing element is then placed into the still liquid from above. Additional clamping of the two housing elements in respect to each other is not required, the weight of the resting upper housing element is sufficient for this.

A solid structure, which through thermal expansion only causes small mechanical forces, can be achieved if the housing elements have solid, bearing components as well as thin-walled elements which are exposed to the heat generation and surround the actual furnace chamber.

It is furthermore advantageous if the means supporting the conveying device and/or heating device are only fixedly connected on one side with the respective housing element and with another side rest loosely on the housing element. Heat expansion without causing twisting can take place by means of this.

DRAWINGS

The principle of the device is illustrated in the sole drawing FIGURE and will be explained in detail in the subsequent description while reciting further advantages.

DESCRIPTION OF THE EXEMPLARY EMBODIMENT

The continuous furnace 10, shown in the pass-through direction, rests on a frame 12 with two U-shaped, linearly (longitudinally) extending rails 14, 16. The rails 14, 16 are connected by a thin sheet metal plate 18, rods 20 and a bow 22, on which a heating device 24 is fastened. A hood-shaped cover 26, supporting a sheet metal plate 28 on the inside, rests on the rails 14, 16.

The downward extending legs 30 of the cover 26 rest in the U-shaped recesses, embodied as liquid reservoirs, of the rails 14, 16, which are filled with a liquid 32 at least far enough that the lower ends of the legs 30 are completely covered.

The sheet metal plate 18, which closes off an interior chamber 34 of the continuous furnace 10 toward the bottom, is adapted to the U-profile of the rails 14, 16 with its two ends facing the rails 14, 16, so that the liquid 32 is contained within these profiled ends.

The sheet metal plate 28 is shaped on its ends facing the legs 30 of the cover 26 in such a way that it encloses the ends of the legs 30 in a way that the liquid 32 lies against the profiled end of the sheet metal plate 28 and not directly against the ends of the legs 30. This together results in an interior chamber 34 enclosed by the sheet metal plates 18 and 28, wherein the sheet metal plates are directly sealed against each other by the liquid 32.

The rods 20 supporting a conveying device 36 are fixedly connected with the rail 14 by an angle brace 38 and are placed loosely and with play 42 on the rail 16 by means of a further angle brace 40. The bow 22 is also fastened with one end on the rail 14 and placed with its other ends loosely on the rail 16. In this case the angle brace 38 and the one end of the bow 22 are placed directly on top of each other and are together fixed on the rail 14 via a fastener 44, not shown in detail. Because of the loose resting on the rail 16 and the play 42, thermally caused expansion of the rods 20 and the bow 22 can take place without generating mechanical stresses.

It is possible to blow a protective gas into the interior chamber 34 by means, not shown here, during the operation of the continuous furnace, which then flows in and against the direction of conveyance and blows out undesired gas components of the air. The penetration by oxygen is effectively prevented by means of the liquid 32 sealing off the two housing elements.

I claim:

1. A device for soldering components on plates under the effect of a gas comprising a furnace chamber which is enclosed by an at least two-piece housing, and wherein: a first housing element has a reservoir for a sealing means into which a second housing element dips partially; the first housing element has a continuous wall area defining the reservoir; said sealing means is a liquid; said second housing element has a supporting part and a sealing part enclosing said furnace chamber; said sealing part encloses said supporting part in the area of said sealing means; and the continuous wall area is provided with reinforcing means in the area of the liquid reservoir.

2. A device in accordance with claim 1, further comprising at least one conveying device and heating device disposed inside the housing.

3. A device in accordance with claim 2, further comprising means which support the conveying device and which are fixedly connected with at least one part of the first housing element and loosely rest on a further part of the first housing element.

4. A device in accordance with claim 2, further comprising means which support the heating device and which are fixedly connected with at least one part of the first housing element and loosely rest on a further part of the first housing element.

5. A device in accordance with claim 3, further comprising means which support the heating device and which are fixedly connected with at least one part of the first housing element and loosely rest on a further part of the first housing element.

* * * * *